US010625445B2

(12) United States Patent
Yui et al.

(10) Patent No.: US 10,625,445 B2
(45) Date of Patent: Apr. 21, 2020

(54) METHOD OF MANUFACTURING SUBSTRATE INTEGRATED GASKET (71) Applicant: NOK CORPORATION, Tokyo (JP)

(72) Inventors: Hajime Yui, Fujisawa (JP); Tetsuya Urakawa, Fujisawa (JP); Kenichi Oba, Fujisawa (JP)

(73) Assignee: NOK CORPORATION (JP)

( * ) Notice: Subject to any disclaimer, the term of this patent is extended or adjusted under 35 U.S.C. 154(b) by 130 days.

(21) Appl. No.: 15/579,828

(22) PCT Filed: Jun. 2, 2016

(86) PCT No.: PCT/JP2016/066334
§ 371 (c)(1),
(2) Date: Dec. 5, 2017

(87) PCT Pub. No.: WO2016/199659
PCT Pub. Date: Dec. 15, 2016

(65) Prior Publication Data
US 2018/0154558 A1 Jun. 7, 2018

(30) Foreign Application Priority Data
Jun. 8, 2015 (JP) .................................. 2015-115481

(51) Int. Cl.
*B29C 43/18* (2006.01)
*H01M 8/0271* (2016.01)
(Continued)

(52) U.S. Cl.
CPC .......... *B29C 43/18* (2013.01); *B29C 35/0805* (2013.01); *F16J 15/12* (2013.01);
(Continued)

(58) Field of Classification Search
CPC ......... B29C 35/00; B29C 39/00; B29C 43/00; B29C 43/18; B29C 35/0805;
(Continued)

(56) References Cited

U.S. PATENT DOCUMENTS 7,195,732 B2 * 3/2007 Umeki ................ B29C 33/3842
216/2
10,226,882 B2 * 3/2019 Becher .................. B29C 43/027
(Continued)

FOREIGN PATENT DOCUMENTS

DE 10-2014-216613 A1 2/2016
EP 1 477 712 A1 11/2004
(Continued)

OTHER PUBLICATIONS

Extended European Search Report for Application No. EP 16 807 366 dated Jun. 6, 2018 (6 pages).

*Primary Examiner* — Peter L Vajda
*Assistant Examiner* — S. Behrooz Ghorishi
(74) *Attorney, Agent, or Firm* — Harness, Dickey & Pierce, P.L.C.

(57) ABSTRACT

Disclosed is a method for manufacturing a substrate-integrated gasket using screen printing. The method includes: a step for forming, on a surface of a substrate by means of screen printing, a coating layer of a paste for forming a gasket; and a step for hardening the coating layer by pressing, at a predetermined height, a coating layer correction member to the coating layer. The cross-sectional shape of the coating layer formed on the surface of the substrate is corrected by means of the coating layer correction member, and in such state, the coating layer hardens to be a gasket, thereby forming a gasket having a highly accurate cross-sectional shape.

4 Claims, 7 Drawing Sheets (51) Int. Cl.
*F16J 15/12* (2006.01)
*F16J 15/14* (2006.01)
*B29C 35/08* (2006.01)
*H01M 8/0286* (2016.01)
*B29K 21/00* (2006.01)
*B29K 705/00* (2006.01)
*B29L 31/26* (2006.01)
*B29L 31/34* (2006.01)

(52) U.S. Cl.
CPC ............ *F16J 15/121* (2013.01); *F16J 15/14* (2013.01); *H01M 8/0271* (2013.01); *H01M 8/0286* (2013.01); *B29C 2035/0827* (2013.01); *B29K 2021/00* (2013.01); *B29K 2705/00* (2013.01); *B29L 2031/265* (2013.01); *B29L 2031/3468* (2013.01)

(58) Field of Classification Search
CPC .. B29C 2035/0827; F16J 15/12; F16J 15/121; F16J 15/14; H01M 8/0286; H01M 8/0271; B29K 2021/00; B29K 2705/00; B29L 2031/265; B29L 2031/3468
See application file for complete search history.

(56) References Cited

U.S. PATENT DOCUMENTS

2004/0234754 A1* 11/2004 Salameh ................ F16J 15/108
428/343
2017/0157812 A1 6/2017 Becher et al.

FOREIGN PATENT DOCUMENTS

| JP | 2001-319669 A | 11/2001 | |
|----|---------------|---------|---|
| JP | 2002-086482 A | 3/2002 | |
| JP | 2004-063295 A | 2/2004 | |
| JP | 5310976 B2 | 10/2013 | |
| WO | WO-02-021890 A1 | 3/2002 | |
| WO | WO-0221890 A1 * | 3/2002 | ........... B29C 31/045 |

* cited by examiner

METHOD OF MANUFACTURING SUBSTRATE INTEGRATED GASKET

CROSS-REFERENCE TO RELATED APPLICATIONS

This application is a U.S. National Stage Application of International Application No. PCT/JP2016/066334, filed on Jun. 2, 2016, and published in Japanese as WO 2016/199659 on Dec. 15, 2016 and claims priority to Japanese Application No. 2015-115481, filed on Jun. 8, 2015. The entire disclosures of the above applications are incorporated herein by reference.

BACKGROUND OF THE INVENTION

Field of the Invention

The present invention relates to a method for manufacturing a substrate integrated gasket by applying a gasket forming material onto a surface of a substrate according to a screen printing.

Description of the Conventional Art

Figure 8A:
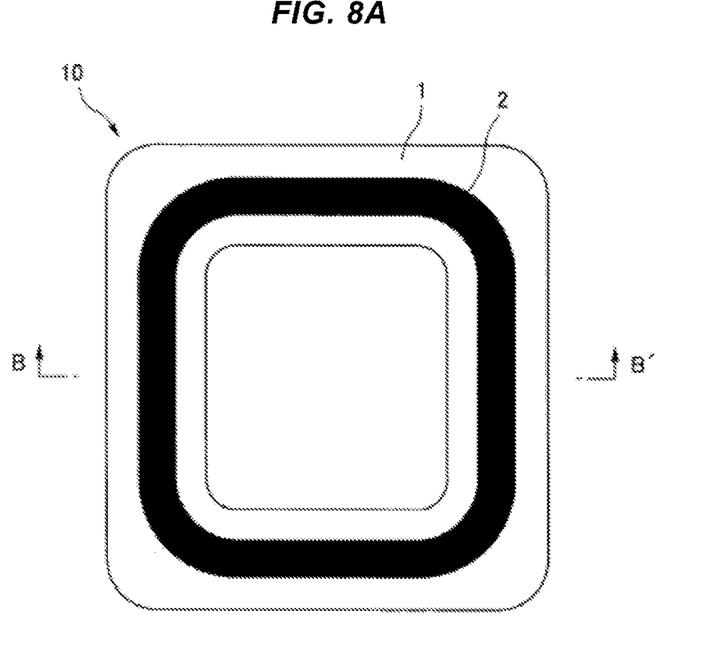
FIG. 8A is a plan view and FIG. 8B is a cross sectional view along a line B-B' in FIG. 8A.
Figure 8B:
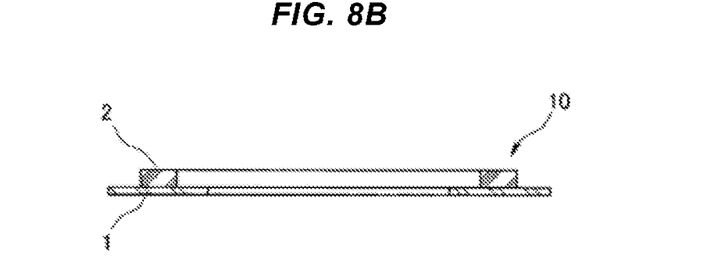

In a fuel battery structured such that a lot of fuel battery cells are laminated, each of the laminated fuel battery cells is provided with a seal means for sealing fuel gas and oxidation gas. As the seal means, there has been known a substrate integrated gasket 10 in which a gasket 2 constructed by a rubber elastic body (a rubber material or a synthetic resin material having a rubber elasticity) having a flat upper surface is integrally formed on a surface of a substrate 1 such as a separator which corresponds to a component of the fuel battery cell, as shown in FIGS. 8A and 8B. Further, it has been known to form the flat gasket mentioned above by using the screen printing, and use the flat gasket by combining with a seal projection or a bead having a chevron protruding shape (refer to Japanese Patent No. 5310976 and Japanese Unexamined Patent Publication No. 2004-63295).

Figure 9:
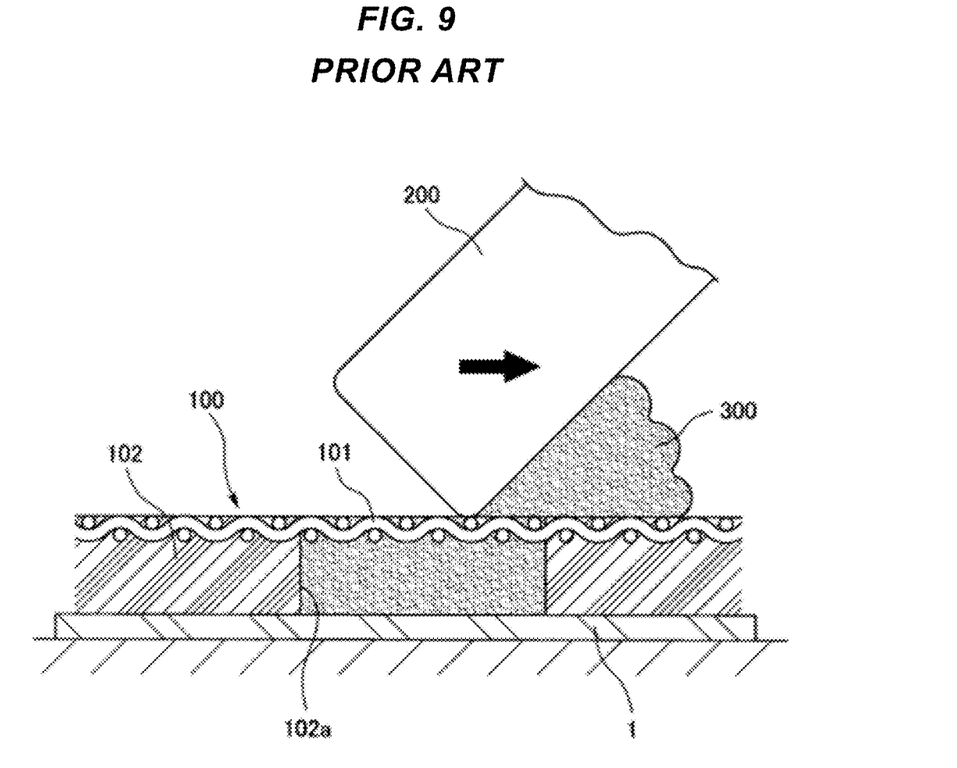
FIG. 9 is an explanatory view showing a process of forming an application layer onto a surface of a substrate according to a screen printing, in a conventional art.
Figure 10:
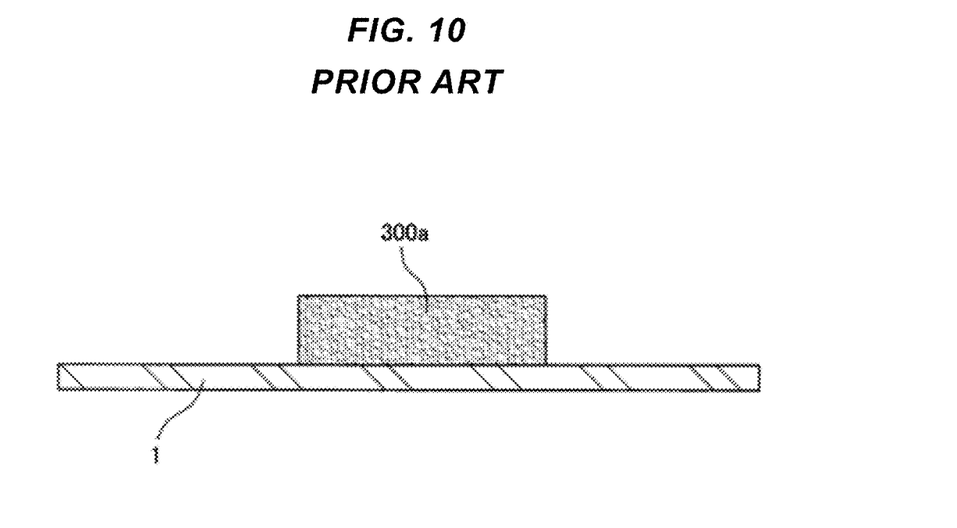
FIG. 10 is an explanatory view showing a state in which the flat application layer is formed onto the surface of the substrate according to the screen printing.

In order to form this kind of substrate integrated gasket 10 according to the screen printing, a paste application layer 300a is formed on a surface of a substrate 1 according to a predetermined print pattern as shown in FIG. 10, by first of all positioning the substrate 1 and bringing the substrate 1 into contact with a lower surface of a screen plate 100 structured such that a mask 102 forming a paste applying opening 102a having a predetermined print pattern corresponding to a planar shape of a gasket is formed in a lower surface side of a screen 101 constructed by a stainless mesh, pressing out a paste 300 which is made of an uncross-linked rubber material for forming the gasket and is supplied onto the screen plate 100 to the paste applying opening 102a of the mask 102 by traveling a squeegee 200 so as to attach the paste 300 to the surface of the substrate 1, and thereafter separating the substrate 1 from the screen plate 100, as shown in FIG. 9. Further, the gasket 2 is integrated with the substrate 1 at the same time of being formed as shown in FIGS. 8A and 8B, by crosslinking an application layer 300a by heat.

Figure 11A:
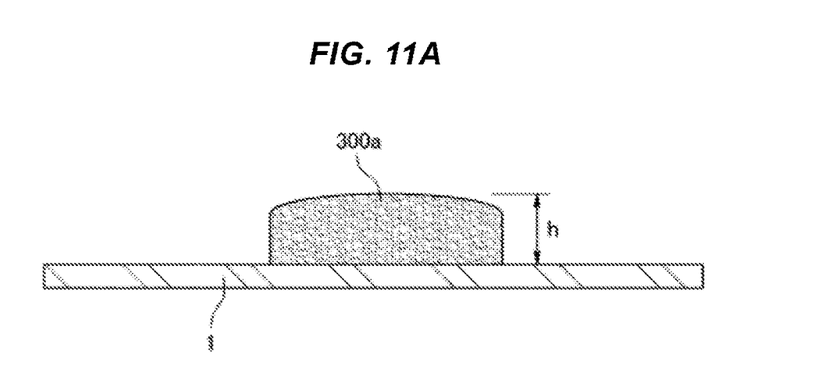
FIGS. 11A and 11B are explanatory views showing an example of a cross sectional shape of the application layer which is formed onto the surface of the substrate according to the screen printing.
Figure 11B:
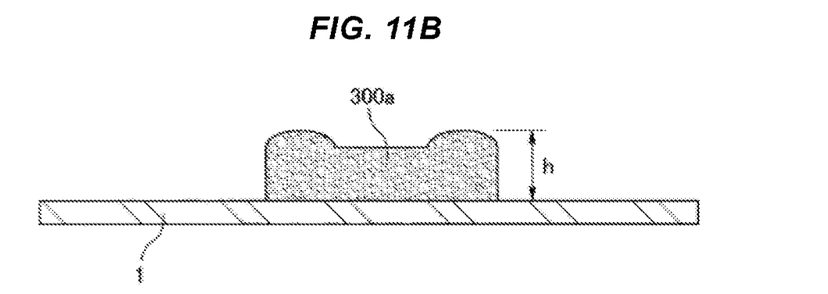

However, in the screen printing mentioned above, the application layer 300a tends to collapse during the process of separating the substrate 1 from the screen plate 100. As a result, a cross sectional shape of the application layer 300a is frequently changed to a curved surface as shown in FIG. 11A or 11B in a practical sense. Further, in this case, a height h of the application layer 300a is widely dispersed. Therefore, there has been fear that a sealing performance becomes unstable in the gasket which is formed in a state of having the cross sectional shape.

The present invention is made by taking the above point into consideration, and a technical object of the present invention is to make it possible to form a gasket having a cross sectional shape with high precision in manufacturing of a substrate integrated gasket with using a screen printing.

SUMMARY OF THE INVENTION

The present invention employs the following means for achieving the technical object mentioned above.

More specifically, a method of manufacturing a substrate integrated gasket according to the present invention is characterized by a step of forming an application layer of a gasket forming paste to a surface of a substrate according to a screen printing, and a step of pressing an application layer correcting member onto the application layer with a predetermined height and curing the application layer.

According to the method mentioned above, the cross sectional shape of the application layer of the gasket forming paste applied to the surface of the substrate according to the screen printing is corrected by the application layer correcting member pressed onto the application layer after the printing, and the application layer is cured in this state and forms the gasket. As a result, the gasket having the high-precision cross sectional shape is formed.

Further, the present invention may further employ the following means for achieving the technical object mentioned above.

More specifically, in the method of manufacturing the substrate integrated gasket having the structure mentioned above, the method is characterized in that the gasket forming paste is made of an ultraviolet curable liquid rubber, the application layer correcting member is constructed by a transparent plate, and the application layer is cured by irradiating ultraviolet light to the application layer via the application layer correcting member.

According to the method, since the application layer correcting the cross sectional shape of the application layer is constructed by the transparent plate, the application layer made of the ultraviolet curable liquid rubber can be cross-linked and cured by irradiating the ultraviolet light to the application layer from the above of the application layer correcting member, it is possible to widely shorten a time for forming the gasket.

Further, in the method of manufacturing the substrate integrated gasket having the structure mentioned above, the method is characterized in that the application layer correcting member is formed into a tabular shape.

According to the method, since the upper surface of the application layer is formed into a flat shape, it is possible to easily manufacture the substrate integrated gasket in which the gasket having the flat upper surface is integrally formed on the surface of the substrate.

Effect of the Invention

On the basis of the method of manufacturing the substrate integrated gasket according to the present invention, it is possible to easily form the gasket having the high-precision cross sectional shape in the manufacturing of the substrate integrated gasket with using the screen printing. Therefore, it is possible to manufacture the substrate integrated gasket which is excellent in the sealing performance.

BRIEF EXPLANATION OF THE DRAWINGS

FIGS. 8A and 8B show an example of the substrate integrated gasket, in which

DETAILED DESCRIPTION OF PREFERRED EMBODIMENTS

A description will be given below of a preferable embodiment in which a method of manufacturing a substrate integrated gasket according to the present invention is applied to manufacturing of a substrate integrated gasket 10 shown in FIGS. 8A and 8B, with reference to the accompanying drawings.

Figure 1:
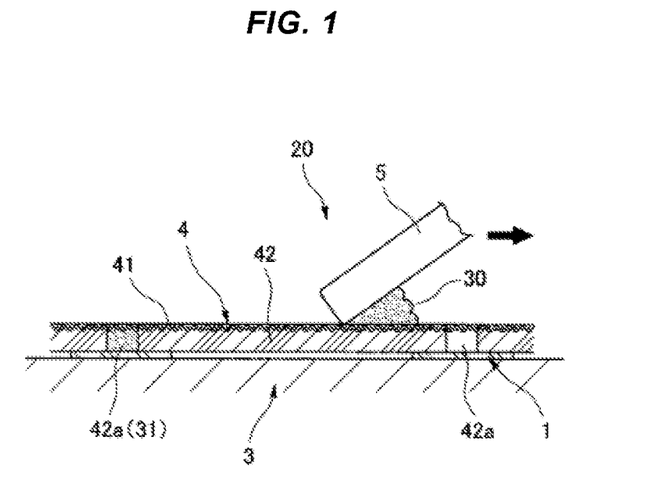
FIG. 1 is an explanatory view showing a process of forming an application layer onto a surface of a substrate according to a screen printing, in a preferable embodiment of a method of manufacturing a substrate integrated gasket according to the present invention.

In this embodiment, first of all as shown in FIG. 1, a gasket forming paste 30 is applied to a surface of a substrate 1 by a screen printing device 20. More specifically, the screen printing device 20 is provided with a movable table 3 which can position and fix the substrate 1 to an upper surface thereof and is moved up and down by an actuator (not shown), a screen plate 4 which is arranged in an upper side of the movable table and is structured such that a mask 42 forming a paste applying opening 42a having a predetermined print pattern corresponding to a planar shape of the gasket is integrally provided in a lower surface side of a screen 41 constructed by a stainless mesh, and a squeegee 5 which travels and moves on an upper surface of the screen plate 4 so as to slide. A thickness of the mask 42 is set in such a manner that a height h1 of a paste application layer 31 applied to the surface of the substrate 1 as shown in FIG. 2 by the screen printing device is appropriately higher than a height h3 (refer to FIG. 6) of the gasket 2 to be formed.

The substrate 1 is constructed by a metal plate which is formed into a rectangular picture frame shape obtained by rounding corners (refer to FIGS. 8A and 8B), the substrate 1 is brought into contact with a lower surface of the screen plate 4 by positioning and installing the substrate 1 on the movable table 3 and thereafter moving up the movable table 3, and a paste 30 supplied onto the screen plate 4 and made of an uncross-linked rubber material for forming the gasket is pressed to the paste applying opening 42a of the mask 42 by the traveling of the squeegee 5 and is attached to the surface of the substrate 1.

Figure 2:
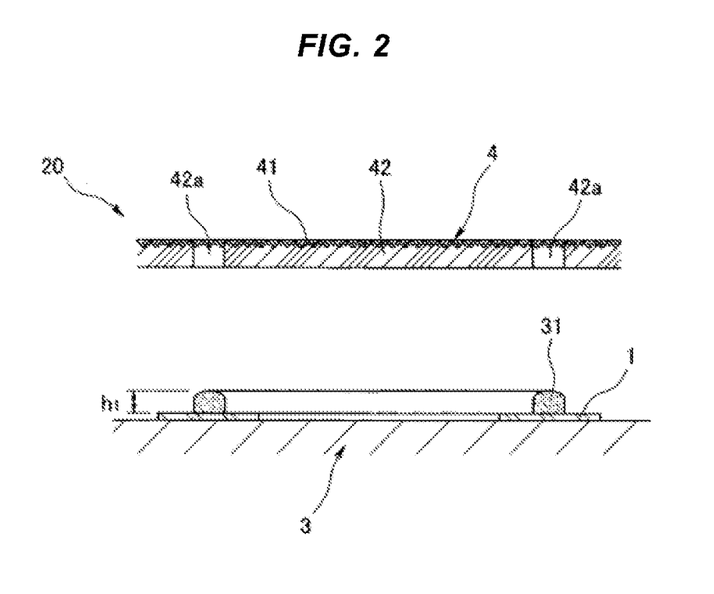
FIG. 2 is an explanatory view showing a state the application layer is formed onto the surface of the substrate according to the screen printing, in the preferable embodiment of the method of manufacturing the substrate integrated gasket according to the present invention.

Next, the substrate 1 is separated from the screen plate 4 by moving down the movable table 3 as shown in FIG. 2. The paste application layer 31 is formed on the surface of the substrate 1 with a predetermined print pattern. Further, the cross sectional shape of the application layer 31 is unstable by a shearing action caused by an attachment property to the screen 41 and the paste applying opening 42a when detaching the screen plate 4, and the height h1 thereof is higher than the height of the gasket to be formed.

Figure 3:
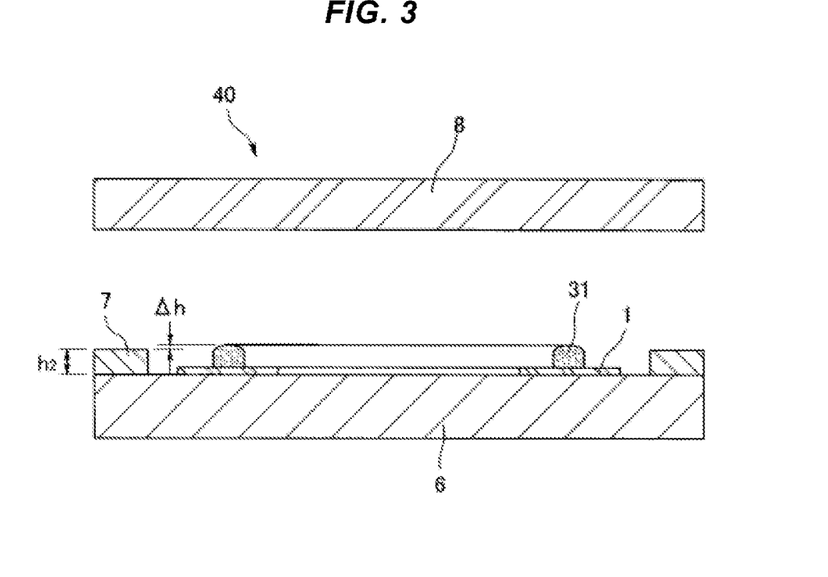
FIG. 3 is an explanatory view showing a process of pressing an application layer correcting member to the application layer, in the preferable embodiment of the method of manufacturing the substrate integrated gasket according to the present invention.

Next, as shown in FIG. 3, the substrate 1 in which the application layer 31 is formed according to the screen printing is installed to a correcting device 40. The correcting device 40 is provided with a table 6 which can position and fix the substrate 1 to an upper surface thereof, a spacer 7 which is arranged so as to surround an installation space of the substrate 1 in the upper surface of the table 6, and an application layer correcting plate correcting plate 8 which can be mounted onto the spacer 7 by an actuator (not shown) and is constructed by a stainless plate. A height h2 of the spacer 7 is set so as to correspond to sum of the height of the gasket to be formed and the thickness of the substrate 1. Therefore, a height of the application layer 31 on the substrate 1 which is positioned and fixed to the upper surface of the movable table 6 is Δh higher than the height h2 of the spacer 7.

Figure 4:
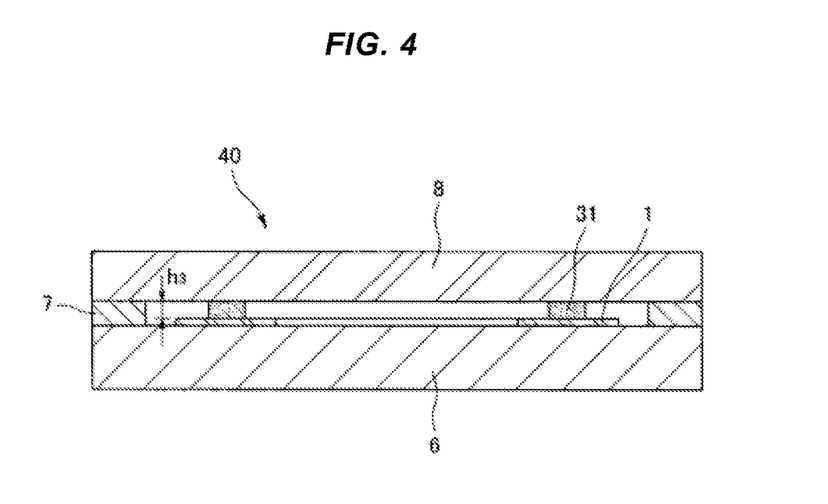
FIG. 4 is an explanatory view showing a step of pressing the application layer correcting member to the application layer and curing the application layer, in the preferable embodiment of the method of manufacturing the substrate integrated gasket according to the present invention.

The application layer correcting member 8 is pressed onto the application layer 31 at a predetermined height, that is, the support height h2 from the table 6 by the spacer 7, by positioning and fixing the substrate 1 to the upper surface of the table 6 and thereafter moving down the application layer correcting plate 8 onto the spacer 7 so as to mount and fix as shown in FIG. 4. As a result, the height of the application layer 31 is pressed down at Δh shown in FIG. 3 to be corrected to a height h3, and the cross sectional shape thereof is formed so that the upper surface is flat.

Figure 5:
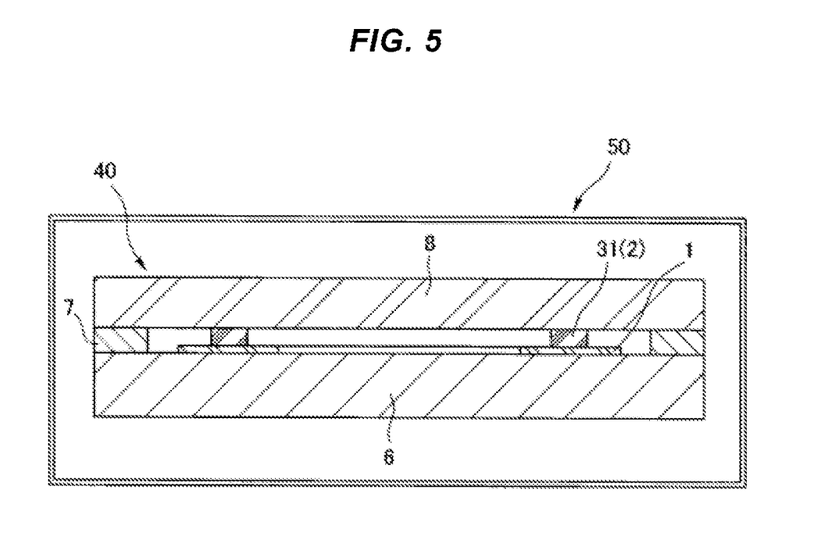
FIG. 5 is an explanatory view showing a step of pressing the application layer correcting member to the application layer and curing the application layer, in the preferable embodiment of the method of manufacturing the substrate integrated gasket according to the present invention.

Next, the application layer 31 is crosslinked and cured by feeding the correcting device 40 to a temperature controlled bath 50 shown in FIG. 5 while keeping a state in which the application layer correcting plate 8 is mounted and fixed onto the spacer 7 as mentioned above, and heating the correcting device 40 within the temperature controlled bath 50 at a predetermined temperature (for example, 130 to 150° C.) for a predetermined time.

Figure 6:
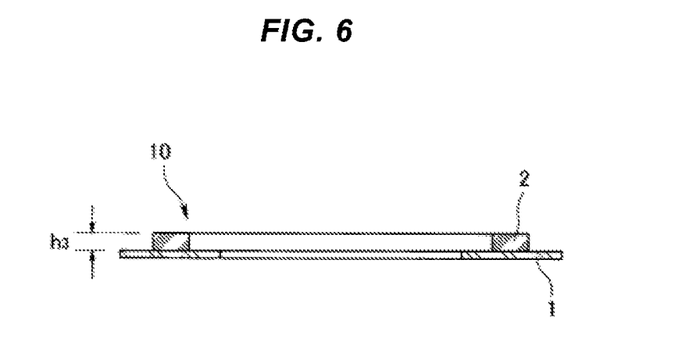
FIG. 6 is an explanatory view showing the formed substrate integrated gasket, in the preferable embodiment of the method of manufacturing the substrate integrated gasket according to the present invention.

After the elapse of necessary time for crosslinking and curing the application layer 31 (forming the gasket 2), the correcting device 40 is fed to an external portion of the temperature controlled bath 50, and the application layer correcting plate 8 is opened. Then, the substrate integrated gasket constructed by the substrate 1 and the gasket 2 integrally formed on the surface of the substrate can be taken out. As shown in FIG. 6, the substrate integrated gasket 10 is flat in the upper surface of the gasket 2, is fixed in the height h3, and has the high-precision cross sectional shape.

A flat gasket is manufactured as an embodiment by printing a paste constructed by an uncross-linked liquid rubber onto a substrate of 100 mm×150 mm according to a screen printing into a paste application layer having a print width (a width of a paste applying opening)=3 mm, and a height of about 350 μm, and feeding the paste application layer in a temperature controlled bath and curing the paste application layer in a state of being corrected to a height of 300 μm by pressing a tabular application layer correcting plate. Observing a cross sectional shape of the formed gasket, the upper surface is confirmed to be flat with high precision. Further, in a gasket which is cured without being pressed by the application layer correcting plate and is formed as a comparative example, the height is dispersed at about 270 to 330 μm. On the contrary, the height is between about 290 and 310 μm in the embodiment, and a dimensional dispersion is confirmed to be improved.

Figure 7:
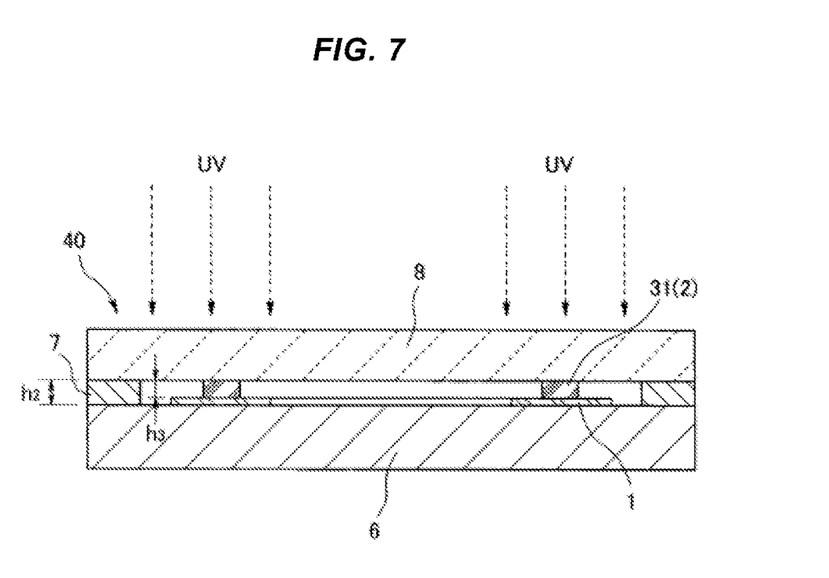
FIG. 7 is an explanatory view showing a step of pressing an application layer correcting member constructed by a transparent plate to an application layer and curing the application layer by irradiating ultraviolet light, in a preferable second embodiment of the method of manufacturing the substrate integrated gasket according to the present invention.

FIG. 7 shows a step of forming an application layer correcting plate 8 in a correcting device 40 by a transparent plate and curing an application layer 31 formed in a substrate 1 according to a screen printing and made of an ultraviolet curable liquid rubber material on the basis of irradiation of ultraviolet light UV, as a preferable second embodiment of the method of manufacturing the substrate integrated gasket according to the present invention.

More specifically, the second embodiment employs the ultraviolet curable liquid rubber material as the gasket forming paste 30 in the screen printing step shown in FIG. 1. Further, the substrate 1 in which the paste application layer 31 is formed in the predetermined print pattern is installed to the correcting device 40 by separating the substrate 1 from the screen plate 4 as shown in FIG. 2. The correcting device 40 is provided with the same structure as that of FIG. 3 which is previously described, except the structure in which the application layer correcting plate 8 is constructed by the transparent plate such as a glass.

Therefore, the application layer correcting member 8 is pressed onto the application layer 31 at the support height h2 from the table 6 by the spacer 7 by positioning and installing the substrate 1 in which the paste application layer 31 made of the ultraviolet curable liquid rubber material is formed, on the upper surface of the table 6 of the correcting device 40, and thereafter moving down the application layer correcting plate 8 onto the spacer 7 so as to mount and fix. Therefore, the height of the application layer 31 is corrected to the height h3, and the cross sectional shape is formed so that the upper surface is flat.

Further, when the ultraviolet light UV is irradiated by the ultraviolet irradiation device (not shown) from the above of the application layer correcting plate 8 in this state, the ultraviolet light UV passes through the application layer correcting plate 8 constructed by the transparent plate, and cures the application layer 31 made of the ultraviolet curable liquid rubber material on the basis of energy thereof. As a result, it is not necessary to feed the correcting device 40 in the temperature controlled bath, and it is possible to cure the application layer 31 for a short time (for example, several tens of seconds).

The substrate integrated gasket constructed by the substrate 1 and the gasket 2 which is integrally formed on the surface of the substrate 1 can be taken out by opening the application layer correcting plate 8, after the elapse of necessary time for crosslinking and curing the application layer 31 (forming the gasket 2) on the basis of the irradiation of the ultraviolet light UV. Further, the substrate integrated gasket is also flat in the upper surface of the gasket 2, is fixed in the height h3, and has the high-precision cross sectional shape as shown in FIG. 6.

What is claimed is:

1. A method of manufacturing a substrate integrated gasket, the method comprising:
    a step of forming an application layer of a gasket forming paste to a surface of a substrate using a screen printing process, the application layer having a first height relative to the substrate; and
    a step of pressing an application layer correcting member onto the application layer and curing the application layer,
    wherein the application layer correcting member includes a table having a spacer formed thereon that includes a second height less than the first height, and the application layer correcting member includes a movable correcting plate that is configured to contact the spacer and press the application layer such that after the application layer is cured, the substrate integrated gasket includes a height equal to the second height.

2. The method of manufacturing the substrate integrated gasket according to claim 1, wherein the gasket forming paste is made of an ultraviolet curable liquid rubber, the movable correcting plate comprises a transparent plate, and the application layer is cured by irradiating ultraviolet light to the application layer via the movable correcting plate.

3. The method of manufacturing the substrate integrated gasket according to claim 2, wherein the movable correcting plate is formed into a tabular shape.

4. The method of manufacturing the substrate integrated gasket according to claim 1, wherein the movable correcting plate is formed into a tabular shape.

* * * * *